US011370194B2

United States Patent
Marchili et al.

(10) Patent No.: US 11,370,194 B2
(45) Date of Patent: Jun. 28, 2022

(54) MULTIFIBROUS MULTILAYER COMPOSITE MATERIAL FOR APPLICATIONS IN THE AUTOMOTIVE SECTOR

(71) Applicant: ALCANTARA S.P.A., Milan (IT)

(72) Inventors: Andrea Marchili, Terni (IT); Walter Cardinali, Marsciano (IT); Gianni Romani, Terni (IT); Giovanni Lelli, Spoleto (IT); Carmine Carlo Ammirati, Lodi (IT); Giovanni Palomba, Terni (IT)

(73) Assignee: ALCANTARA S.P.A., Milan (IT)

( * ) Notice: Subject to any disclaimer, the term of this patent is extended or adjusted under 35 U.S.C. 154(b) by 248 days.

(21) Appl. No.: 16/480,931

(22) PCT Filed: Jan. 24, 2018

(86) PCT No.: PCT/IB2018/050418
§ 371 (c)(1),
(2) Date: Jul. 25, 2019

(87) PCT Pub. No.: WO2018/138641
PCT Pub. Date: Aug. 2, 2018

(65) Prior Publication Data
US 2019/0389175 A1 Dec. 26, 2019

(30) Foreign Application Priority Data
Jan. 26, 2017 (IT) .......................... 102017000008269

(51) Int. Cl.
*B32B 5/26* (2006.01)
*B32B 5/02* (2006.01)
(Continued)

(52) U.S. Cl.
CPC ................ *B32B 5/26* (2013.01); *B32B 5/022* (2013.01); *B32B 5/026* (2013.01); *B32B 5/18* (2013.01);
(Continued)

(58) Field of Classification Search
CPC ............ B32B 37/12; B32B 2037/1253; B32B 38/0004; B32B 2038/0016; B32B 5/26;
(Continued)

(56) References Cited

U.S. PATENT DOCUMENTS 3,769,376 A 10/1973 Arbaud et al.
4,941,886 A * 7/1990 Poletto ................. D06N 3/0059
8/497
(Continued)

FOREIGN PATENT DOCUMENTS

EP 2123824 A1 11/2009
GB 2235652 A * 3/1991 ............. D04H 13/00
(Continued)

*Primary Examiner* — Cheryl Juska
(74) *Attorney, Agent, or Firm* — Jeffrey N. Townes; Cozen O'Connor (57) ABSTRACT

The present invention concerns a process for preparing a microfibrous multilayer composite material comprising: 1) realizing a non-woven microfibrous semi-finished product made up of microfibres of one or more polymers dispersed in a polyurethane matrix (semi-finished product IE); 2) cutting the semi-finished product lengthwise into two layers; 3) buffing at least one layer on one side (side N) so as to extract the microfibres and form the nap, thereby obtaining a semi-finished raw product; 4) cutting at least one semi-finished raw product lengthwise parallel to the surfaces, producing an non-woven intermediate product, containing the buffed side (side N) and a waste layer (containing the side that has not been buffed—side S); 5) coupling the non-woven intermediate product (on the side opposite side N) to a fabric made of polyethylene terephthalate fibres by
(Continued)

means of the application of a thermoplastic polyurethane adhesive that can be cross-linked between the non-woven intermediate product and the fabric; 6) submitting the multilayer composite material to a jet dyeing process. The invention also concerns a multilayer composite material that can be obtained by the process of the invention and the use thereof for covering the internal side of roofs or headliners of vehicles and for covering furnishing elements.

19 Claims, 6 Drawing Sheets (51) Int. Cl.
  B32B 7/12      (2006.01)
  B32B 5/18      (2006.01)
  B32B 5/24      (2006.01)
  B32B 37/12     (2006.01)
  D06N 3/14      (2006.01)
  D06N 3/00      (2006.01)
  B32B 38/00     (2006.01)
  B32B 27/40     (2006.01)
  B32B 27/12     (2006.01)
(52) U.S. Cl.
  CPC ............. *B32B 5/245* (2013.01); *B32B 5/265* (2021.05); *B32B 5/279* (2021.05); *B32B 7/12* (2013.01); *B32B 27/12* (2013.01); *B32B 27/40* (2013.01); *B32B 37/12* (2013.01); *B32B 38/0004* (2013.01); *D06N 3/0004* (2013.01); *D06N 3/0011* (2013.01); *D06N 3/0072* (2013.01); *D06N 3/0075* (2013.01); *D06N 3/14* (2013.01); *B32B 2037/1253* (2013.01); *B32B 2038/0016* (2013.01); *B32B 2260/021* (2013.01); *B32B 2260/046* (2013.01); *B32B 2262/0276* (2013.01); *B32B 2262/0284* (2013.01); *B32B 2266/0278* (2013.01); *B32B 2605/003* (2013.01); *D06N 2203/068* (2013.01); *Y10T 428/2395* (2015.04)

(58) Field of Classification Search
  CPC ......... B32B 5/265; B32B 5/022; B32B 5/026; B32B 5/279; B32B 5/18; B32B 5/245; B32B 7/12; B32B 27/12; B32B 27/40; B32B 2605/003; B32B 2307/50; B32B 2307/732; B32B 2307/72; B32B 2307/718; B32B 2260/046; B32B 2260/021; B32B 2262/0284; B32B 2266/0278; B32B 2262/0276; D06N 3/0004; D06N 3/0011; D06N 3/0072; D06N 3/0075; D06N 3/14; D06N 2203/061; D06N 2203/068; D06N 2205/04; D06N 2209/10; D06N 2211/261; Y10T 428/2395
  See application file for complete search history.

(56) References Cited

U.S. PATENT DOCUMENTS

| 5,277,969 | A  | * | 1/1994  | Borri ...................... B32B 27/12 442/225 |
| 5,798,165 | A  | * | 8/1998  | Mizoguchi ............. C08G 18/44 428/160 |
| 2006/0008631 | A1 | * | 1/2006  | Takeyama ................ B32B 5/26 428/295.1 |
| 2009/0053948 | A1 | * | 2/2009  | Fujisawa ............. D06N 3/0004 442/164 |
| 2009/0274862 | A1 | * | 11/2009 | Nakayama ............... D04H 3/16 428/91 |
| 2009/0286436 | A1 | * | 11/2009 | Koide ................. D06N 3/0004 442/59 |
| 2014/0322466 | A1 | * | 10/2014 | Belloni ................. D04H 1/465 428/36.1 |
| 2017/0183815 | A1 | * | 6/2017  | Kuroda .................... B32B 5/08 |

FOREIGN PATENT DOCUMENTS

JP     62069887 A  *  3/1987
KR    900003113 B1 *  5/1990
WO    2013/108163 A1   7/2013

* cited by examiner

MULTIFIBROUS MULTILAYER COMPOSITE MATERIAL FOR APPLICATIONS IN THE AUTOMOTIVE SECTOR

CROSS-REFERENCE TO RELATED APPLICATIONS

This application is a 371 national-stage application of International PCT Application No. PCT/IB2018/050418, filed Jan. 24, 2018, which claims priority to Italian Patent Application No. 102017000008269, filed Jan. 26, 2017, all of which are incorporated herein by reference in their entirety.

TECHNICAL FIELD OF THE INVENTION

The object of the present invention is a multilayer composite material comprising a layer of suede-like microfibrous non-woven fabric coupled to a fabric made of polymeric fibres, having improved mechanical performance that makes it particularly suitable for covering the interiors of motor vehicles, particularly for covering particular and highly complex shapes such as the internal side of a roof, also defined as a headliner, or the parcel shelf or the pillars. The invention also concerns a process for obtaining this composite material.

STATE OF THE ART

Synthetic artificial leathers having a suede-like appearance are known in the prior art and they are characterized by a surface with a high density of microfibres and by a polymeric matrix capable of binding this microfibrous structure.

The microfibres constituting the materials of this type are generally polyester- and/or polyamide-based and the binding matrix is of the polyurethane type. Usually, in addition to retaining the microfibres constituting the non-woven fabric, the binder used also gives the composite structure enhanced mechanical properties and greater wear resistance. However, it also has a negative effect on its softness and formability. For this reason, the amount of binder generally used in high-quality artificial leather is comprised within a range that makes it possible to prevent this negative effect from being excessively pronounced on any of the characteristics cited.

The methods used by the Applicant for manufacturing high-quality artificial leather with a suede-like appearance are known in the sector and they refer to a process that can be outlined as follows:
1. Spinning a bicomponent fibre of the "sea-island" type, in which the "island" component consists of polyester and/or polyamide and the "sea" component consists of a polymer that is immiscible in the island component and that can be dissolved in suitable solvents of an organic or inorganic type. The microfibres obtained following the dissolution of the sea component typically have counts lower than 0.5 dtex
2. Preparing a felt characterized by well-defined density and unit weight values by means of a mechanical needle-punching process that is capable of interfacing the microfibres obtained in step 1 with each other.
3. Impregnating the felt with a binder capable of retaining the "islands" during the subsequent step of eliminating the "sea" component. This binder, which also has the function of adequately reinforcing the felt to a degree such as to permit its immersion in the solvent used for eliminating the "sea", can be of two different types.

The first type is typically based on a water-soluble polymer, generally polyvinyl alcohol, intended to be removed in a subsequent step of the process.
The second type is typically based on an insoluble polymer, generally polyurethane, which even after the subsequent steps of the process, remains partially or totally in the final composite material.
4. Dissolving the "sea" component in a suitable organic solvent (normally trichloroethylene) or an inorganic solvent (an aqueous solution that is acidic, basic, or simply in hot water) to yield microfibrous material.
5. Impregnating said microfibrous material with a solution of polyurethane (PU) in organic solvents (dimethylformamide, DMF). Alternatively, this impregnation can be performed with polyurethane in an emulsion or aqueous dispersion.
6. Eliminating the binder used in step 3 (if the binder is not a polyurethane).
7. Dividing the bicomponent laminate ("island" component+ PU) into 2 equal parts by means of a longitudinal cut parallel to the surfaces.
8. Buffing the surfaces of the product, by means of suitable treatment with abrasive paper, to give the structure the characteristic suede-like appearance.
9. Final dyeing of the product.

One of measures often employed in order to widen the range of application of artificial suede-like leathers is that of resorting to combinations of these leathers with various kinds of supports that are capable of making the material compatible with applications that require greater mechanical strength and/or different characteristics relating to formability.

The simplest and most widely-used method for combining the microfibrous substrates with the different supports is to couple them with textile supports by means of suitable adhesives, following the dyeing process. Dyeing typically precedes coupling with the various supports because it is difficult to identify adhesives that can resist the severe process conditions used for dyeing artificial leathers of the suede-like type and which, at the same time, enable sufficient softness of the product to be preserved.

One result of this limitation consists is that it is impossible to obtain a final composite product, coupled with a fabric support, having both sides dyed in the same dyeing process and thus characterized by more or less pronounced similarity of the appearance of the two surfaces.

These differences are also due to the common use, as supports, of materials that have a structure significantly different from that of the suede-like surface. In fact, in order to give the product the physico-mechanical characteristics necessary for the different applications, the supports are usually textile structures of various types having a visual appearance that is very different from the microfibrous surface with a non-woven structure.

For example, multilayer composite materials obtained by coupling suede-like artificial leather with textile structures of various types following the process for dyeing the same leather (materials used for various covering applications in the automotive sector and for interior furnishings) are disclosed in the following patents.

GB 2235652 and GB 2235651 make known a multilayer material composed of a layer of microfibrous non-woven fabric coupled by heat-coupling, by means of an adhesive of a polyester or polyamide type, to a layer of fabric made of cotton, polyester, nylon, viscose or blends thereof. The two layers composing the composite material are dyed separately prior to coupling. The multilayer composite material has a weight of 435 g/m² and an elongation lengthwise/crosswise of 2.8% and 3.3% (Example 1), or a weight of 398 g/m² (Example 2) and an elongation lengthwise/crosswise of 19% and 26%. The composite material is employed for covering armchairs, sofas, seats for automobiles and similar items.

U.S. Pat. No. 5,277,969 makes known a multilayer composite material consisting of a layer of microfibrous non-woven fabric coupled, by means of a polyester- or polyamide-based adhesive, to a fabric of mixed cotton/polyester fibres or of nylon fibres or of polyester fibres (Examples IV, VI and VII). The weight of the composite material ranges from 360 g/m² to 410 g/m² and the % elongation (ASTM D 1682) ranges from 15 to 55. The composite material is used to cover automobile seats.

Patent EP0744489 refers to a multilayer composite material specifically designed to be applied as a lining for rigid articles during the process for thermoforming these same articles. The rigid articles are pieces of furniture for decorating or components for the interiors of automobiles. The multilayer composite material consists of a polymer film (polyether, polyester, polyethylene, polypropylene and polyamide) coupled to a microfibrous non-woven fabric by means of the application of heat. The coupling temperature is within the range of 80 to 150° C. and it corresponds to the softening temperature of the polymer film. Coupling thus does not take place with the use of an adhesive, but by exploiting the capacity of the softened polymer film to adhere to the microfibrous non-woven fabric. The thermoforming process takes place by heating a thermoplastic material to a temperature between 140 and 250° C., applying the multilayer composite material to the softened thermoplastic material and then thermoforming the resulting structure so as to obtain the object of the desired shape.

In a similar manner, patent EP0786333 discloses a multilayer composite material to be used as a cover for objects for interior decorating and for the interiors of automobiles formed by means of injection moulding. The composite material consists of a copolyester film coupled to a microfibrous non-woven fabric by means of a polyester- or polyamide-based adhesive. The composite material is applied to the mould of the desired shape, with the layer of microfibrous non-woven fabric facing the mould. The layer of copolyester is impermeable to the polymer material that is injected into the mould to form the object.

Another method previously utilized to efficiently combine the microfibrous sublayers with the various supports used and that also makes it possible to overcome the critical points described above, consists in "bonding" the various layers in a processing step "upstream" of the dyeing process, without resorting to the glues cited hereinabove. A particular technology of this type is revealed in U.S. Pat. Nos. 4,368,227 and 5,112,421. Both of these patents include the use of "multilayer" structures consisting in the combination of a microfibrous non-woven fabric with a traditional fabric or a knit fabric.

In these patents, the bonding of the various layers of the composite material is ensured by an intertwining of the fibres constituting these same layers, said intertwining being obtained by means of suitable needle-punching technologies.

The limits of the solution proposed by U.S. Pat. No. 4,368,227 are principally due to the need to use large amounts of polyurethane binder owing to the use of very short fibres that are intertwined by means of water jet needle-punching. In fact, the water jet needle-punching process is not capable of ensuring a degree of intertwining such as to enable the use of small amounts of polyurethane binder in the subsequent impregnation step. One drawback of U.S. Pat. No. 5,112,421, which uses longer fibres (>20 mm) and thus requires smaller amounts of the binder to retain them, consists in the need to use highly twisted yarns for the production of the fabrics constituting the reinforcing layer. This is because the proposed solution comprises the overlapping of the single layers—the microfibrous layers and those that are not microfibrous—and the performance of the subsequent needle-punching procedures, which lead to the production of an intermediate product characterized by suitable thickness and density values.

Therefore, the purpose of the use of highly twisted yarns is to protect these composite materials from excessive structural weakening, but, on the other hand, there are repercussions on the appearance of the finished product. In fact, the high needle-punching density required is such as to bring a significant number of fibre "bundles" with conventional denier counts towards the microfibrous surface (that is, the "exposed" surface of the final product), and these "bundles" compromise the homogeneity of the appearance typical of high-quality artificial suede-like leather.

A similar solution is proposed in patent EP 1760189, which discloses a composite material in which a microfibrous semi-finished product is coupled to a fabric (by means of a copolyamide-based adhesive) prior to impregnation with polyurethane and prior to the dyeing process. The final composite material has two distinct layers between which there is no interpenetration of the fibres, but the layers are held together by the impregnation of both layers by the polyurethane. This composite material can be used to cover padded furnishing components of automobiles (e.g. for covering the seats in automobiles).

In spite of the fact that while the multilayers described in U.S. Pat. Nos. 4,368,227 and 5,112,421 and in EP 1760189 can resolve the drawbacks of previous composite materials (that is, the impossibility of obtaining a final composite material having both sides dyed in the same dyeing process and thus characterized by a more or less marked similarity of the appearance of the two surfaces), they do not offer mechanical performance sufficient for specific applications for covering motor vehicle components, which require multilayers characterized by greater elasticity and formability.

Therefore, there is still a strong need for new microfibrous composite materials that can be used, for example, for covering the inside headliners of motor vehicles—an application that requires high levels of elasticity and resistance of the material, given the high stress conditions to which the material is subjected during application to the rigid support.

SUMMARY OF THE INVENTION

The present invention concerns a process for producing a multilayer composite material comprising a layer of microfibrous non-woven fabric coupled to a layer of fabric (preferably knitted) made of polyethylene terephthalate fibres by means of the use of an adhesive that is capable of resisting the severe process conditions used for dyeing artificial leathers of the suede-like type.

The process of the invention is characterized by the performance of the dyeing step downstream of the preparation of the multilayer. This is possible owing to the use of an adhesive that is capable of resisting the dyeing conditions of the process for dyeing suede-like leathers. In this manner, the final multilayer has a uniform colour and appearance on both surfaces. Moreover, the coupling with the particular fabric made of polyester fibres (polyethylene terephthalate) gives the multilayer characteristics of elasticity, flexibility and formability that are superior to those that can be obtained with the multilayers of patents GB 2235652, GB 2235651, EP 0744489 and EP 0786333 (which are dyed prior to being coupled) and to those that can be obtained with the multilayers of U.S. Pat. Nos. 4,368,227, 5,112,421 and EP 1760189 which are coupled prior to the dyeing process.

Owing to its improved characteristics in terms of elongation at break and formability, the microfibrous multilayer material of the invention can be used for particular applications including for example for covering the internal side of roofs (headliners) of vehicles and for covering other components in the interior decoration sector and the automotive sector, which require extraordinary breaking strength, elongation and a certain degree of deformability of the covering.

BRIEF DESCRIPTION OF THE FIGURES

FIGS. 1-6 show an automobile headliner covered with the multilayer composite material of the present invention. In particular.

DETAILED DESCRIPTION OF THE INVENTION

The present invention concerns a procedure for preparing a microfibrous multilayer composite material comprising:
1) realizing a non-woven microfibrous semi-finished product made up of microfibres of one or more polymers dispersed in a polyurethane matrix (semi-finished product IE);
2) cutting the semi-finished product lengthwise into two layers;
3) buffing at least one layer on one side (side N) so as to extract the microfibres and form the nap, thereby obtaining a semi-finished raw product;
4) cutting once again at least one semi-finished raw product lengthwise parallel to the surfaces, producing a non-woven intermediate product, containing the buffed side (side N) and a waste layer (containing the side that has not been buffed—side S);
5) coupling the non-woven intermediate product (on the side opposite side N) to a fabric made of polyethylene terephthalate fibres by means of the application of a thermoplastic polyurethane adhesive that can be cross-linked between the non-woven intermediate product and the fabric;
6) submitting the multilayer composite material to an exhaust dyeing process with dispersed dyes in a so-called "Jet machine" at a temperature in the range of 110 to 140° C. in a buffered aqueous bath with a pH between 4 and 5.

The microfibrous semi-finished product of step 1) is prepared by means of procedures that are known in the sector, for example according to the outline reported below:
a. preparing a felt by needle-punching a bicomponent fibre of the "island-in-the-sea" type;
b. hot impregnation of said felt with an aqueous solution of polyvinyl alcohol (PVA) having a degree of saponification of at least 88%, or hot impregnation of said felt with water and then cold impregnation with polyurethane (PU);
c. removal of the sea component of the bicomponent fibre from the intermediate product of step b;
d. impregnation of the microfibrous intermediate product with PU;
e. fixing the PU to the microfibrous intermediate product by means of coagulation and removing the PVA possibly added in step b.

In particular, preparation of the felt according to step a takes place by needle-punching a bicomponent fibre of the "island-in-the-sea" type. This can be carried out according to prior-art techniques, which comprise the feeding of two pure polymers or two mixtures of polymers to a spinneret so that one of the two polymeric components ("sea") completely surrounds the other component constituted by various polymeric filaments that form the various "islands". In this regard, the island component can be chosen from among: modified polyesters, cationic polyesters, nylon or other types of polyamides, polyethylene (PE), polypropylene (PP), polytrimethylene terephthalate (PTT), polybutylene terephthalate (PBT), polyhydroxyalkanoates (PHA), polyethylene furanoate (PEF) and polyethylene terephthalate (PET), the latter being particularly preferred. The polymers listed above can be produced starting from raw materials obtained from renewable sources (which completely or partly replenish the current raw materials of fossil origin) or the polymers can be produced through fermentation processes or using microorganisms. Examples of polymers falling within the first case are PTT, PEF, PET, PLA and PE. Examples of polymers falling within the second case are PHAs.

An example of a sea component is, however, represented by a spinnable polymer, preferably chosen from among: polystyrene (PS), polyvinyl alcohol (PVA), polystyrene copolymers containing PVA (co-PVA-PS), copolyesters containing PVA (co-PVA-PES) and copolyester containing 5-sulphoisophthalic acid or the sodium salt thereof (co-PES), the latter being particularly preferred.

The polymers listed above can also be produced starting from raw materials obtained from renewable sources or the polymers can be produced through fermentation processes or using microorganisms. Both the sea and island components can be used in a mixture with added components selected from among inorganic pigments for the island component—and normally used to increase lightfastness (e.g. Carbon Black pigments in a percentage of up to 2% by weight)—and incompatible polymers for the sea component which facilitate breakage of the sheath during the steps for drawing and production of the intermediate felt product.

In one particularly preferred embodiment, the felt as per step a is obtained by needle-punching a bicomponent fibre made up of PET and Co-PES, possibly mixed with added inorganic pigments in the island component and with incompatible polymers in the sea component.

The ratio of the island component to the sea component in the bicomponent fibre is such as to enable spinning of the two components by means of a spinneret rapidly and efficiently. Said island/sea ratio is preferably within the range of 20/80 to 80/20, more preferably within the range of 50/50 to 80/20. Prior to the needle-punching process, the bicomponent fibre is usually treated according to known methods of the prior art, which comprise stages in lubricants and drawing so as to improve the orientation of the macromolecules in the drawing direction and the physico-mechanical properties, in addition to decreasing the fibre count of the fibre thus obtained—this latter characteristic being required particularly for the production of products of fine quality. In a preferred embodiment of the invention, prior to being drawn, the fibre has a count in the range of 6.5 to 19.4 dtex, preferably in the range of 9.2 to 17 dtex. Moreover, drawing is carried out with ratios generally varying in the range of 2-5, preferably in the range of 2.1-3.9. At the end of step a, a felt is obtained of a thickness preferably ranging between 2 and 4 mm, and it has an apparent density ranging between 0.1 and 0.5 g/cm³, more preferably ranging between 0.15 and 0.3 g/cm³. Advantageously, said density and thickness values prove to be optimal for obtaining a final non-woven product offering a good hand, softness, appearance and mechanical strength under the process conditions.

The felt obtained following step a is then impregnated as per step b of the present process. In practice, the step of impregnating the felt can take place by means of contact of the latter with a hot aqueous solution of PVA having the characteristic of becoming only slightly soluble under the conditions of removal of the sea component, once it has dried and been treated at high temperature or with suitable additives. Alternatively, step b can take place by means of hot water shrinkage and subsequent cold impregnation with PU in an aqueous medium. In this latter case, following hot water shrinkage, the felt preferably undergoes a drying stage, followed by subsequent cold impregnation with PU in an aqueous medium. Unless specified otherwise, "hot water shrinkage" is intended as a step of immersion in water at a temperature of at least 50° C., preferably ranging between 60 and 99° C. "Cold impregnation", however, is intended to indicate an impregnation temperature no higher than 50° C., more preferably within the range of 15 to 40° C. In both cases, impregnation can be realized by means of known techniques of the prior art, including for example, immersion and metering by means of squeeze rolls. Hot impregnation of the felt with water or a solution of PVA takes place at a temperature of at least 50° C., preferably within the range of 60 to 99° C., so as to achieve dimensional stabilization of the intermediate product as well, owing to the release of the tensions accumulated with the spinning, drawing and felting process. Dimensional stabilization also generally produces an increase in density with a resulting improvement in the aesthetic characteristics of the final product obtained.

In particular, the PVA utilized in step b is characterized in that it has a solubility in water, or in aqueous solvents, which is markedly lower than the solubility of the "sea" component of the bicomponent fibre under the dissolution conditions. With this aim, the present process comprises the use of a PVA with a high degree of saponification, that is, of at least 88%, even more preferably of over 97%. Said degree of saponification enables the PVA to be insoluble in an aqueous medium, this insolubility being such as to resist the subsequent treatment for removal of the sea component, without jeopardizing the dissolution thereof in water following step e of the process as described herein below. Advantageously, the use of PVA having said degree of saponification permits the realization of step b without employing any cross-linking agents, including for example boric acid or vanadium or zirconium compounds, which are potentially harmful to health.

The solubility of the PVA can also be adjusted after impregnation step b, by means of high-temperature thermal treatments. In this regard, the felt impregnated with PVA is treated after drying at a temperature ranging between 150° C. approximately and 250° C. approximately, for example through the use of ovens, jets of air or infrared radiation, for a period that can vary from less than one minute to about 15 minutes, typically depending on the temperature utilized, the required degree of resistance to dissolution and the degree of saponification.

In the case in which step b is carried out by impregnation of the felt with PU, the latter is preferably selected from among the formulations of polyurethane in an aqueous medium, for example in the form of an emulsion or aqueous dispersion. The polyurethane thus mixed can be fixed by means of hot-air coagulation, in a solution containing acids, in aqueous solutions containing electrolytes, by radiofrequency, microwave and steam coagulation. As is known, PU is a polymer that has a polymeric chain made up of urethane bonds only (that is, —NH—(CO)—O—) or a mixture of urethane and urea bonds (that is, —NH—(CO)—NH—), and it is prepared by reaction between a polyol and a diisocyanate. In the present invention, the PU is preferably obtained by reaction of an aliphatic or aromatic diisocyanate with polyols of a mean molecular weight ranging between 500 and 5000 Da, even more preferably selected from among: polyether, polyester, polycarbonate and a polyester-polycarbonate blend.

In one embodiment, step b can take place in the presence of further additives, including for example thickeners, surfactants, viscosity regulators in general, salts of alkali metals or of alkaline earth metals such as $CaCl_2$ and the like, and silicone derivatives. At the end of the impregnation step, the felt impregnated with PVA or PU usually undergoes a step for thermo-fixing the PVA or PU (curing), which takes place by means of thermal treatment at a temperature of at least 90° C., preferably ranging between 150 and 250° C., even more preferably ranging between 180 and 220° C. Said treatment can take place using ovens, according to known methods of the prior art. In this manner, it is possible to stably fix the PVA or PU to the felt, thereby making it possible to carry out the next step for removal of the "sea" component, without substantially modifying the PVA or PU content in the material.

In this regard, step c for removal of the "sea" component takes place by means of contact of the felt impregnated with PVA or PU, as obtained previously in step b, with a basic aqueous solution of alkaline or earth-alkaline hydroxide preferably NaOH. Said contact takes place preferably by immersion (washing) of the felt impregnated with PVA or PU in the selected basic aqueous solution, which can also be followed by repeated washing with water, for the purpose of ensuring the elimination of possible residues of the basic solution on the sample that could cause partial and undesired dissolution of the "island" component. Preferably, the pH level of this solution is at least 8 and preferably within the range of 10 to 14. In one embodiment, the concentration of the basic solution ranges between 1 and 48%, preferably between 5 and 15%. The removal of the "sea" component as per step c takes place at a temperature and for a period of time that are selected so as to optimize the selective dissolution of this component, dissolving the least possible amount of PVA or PU applied, while also avoiding degradation of the microfibre of the "island" component. To achieve more efficient removal and shorter time periods, the temperature of the basic solution is preferably at least 40° C., more preferably at least 60° C., even more preferably within the range of 65 to 90° C., if impregnation step b is carried out using a PU. In the case in which step b is carried out with PVA, the temperature during the removal step is preferably lower than 80° C.

The microfibrous intermediate product deprived of the "sea" component is then submitted to step d for impregnation with PU. In particular, the latter can be present in an aqueous medium, for example in emulsions or aqueous dispersions, or even in an organic medium, for example in a solution with polar organic solvents. The concentration of the impregnation solution preferably ranges between 10 and 40%, more preferably between 15 and 30%. Concentrations greater than 30% could prove to be particularly viscous and difficult to impregnate (especially for solvent-based polyurethanes), while concentrations lower than 10% could cause poor stability of the PU dispersion over time and markedly modify the structure of the coagulated polyurethane and the type of adhesion between the polyurethane and the microfibre to the point of jeopardizing the resistance of the intermediate product during the dyeing process. In a manner similar to step b of the present process, impregnation with PU as per step d typically takes place by means of immersion and metering with squeeze rolls or by means of known techniques of the prior art (for example, pressure waves). Preferably, the microfibrous intermediate product is impregnated with the PU by immersion and metering with squeeze rolls.

In the case of impregnation with PU in an aqueous medium, this can be conveniently performed using a so-called self-emulsifying polyurethane polymer, and/or by adding suitable external emulsifiers, such as ionic and non-ionic surfactants for example. Preferably, the emulsifiers are employed at concentrations ranging between 0.5 and 10% with respect to the PU. With the aim of obtaining the desired mechanical characteristics and the desired resistance to solvents, in step d the impregnation can take place in the presence of a cross-linking agent that is preferably capable of activation during the drying stage of the PU at a temperature in the range of 100° C. approximately to 200° C., preferably in the range of 110° C. approximately to 160° C. Said cross-linking agent is preferably utilized in amounts ranging between 0.5 and 10%, and it may be selected from among: melamines, aziridines, epoxides, zirconium compounds, isocyanate derivatives or preferably, carbodiimides and blocked isocyanates that have a low unblocking temperature. Furthermore, impregnation with PU can take place in the presence of further additives including, for example, thickeners, surfactants, viscosity regulators, destabilizing agents, salts of alkali metals or of alkaline earth metals and silicone derivatives, blowing agents, simple sugars, polymers compatible and miscible with the polyurethane and soluble in water, preferably in amounts ranging between 0 and 10%, more preferably ranging between 0 and 5%, with respect to the PU. $CaCl_2$ is an example of an alkaline salt and it is used to facilitate the destabilization of the dispersion of polyurethane with an increase in the temperature (PUs capable of thermal coagulation), whether it is found in the dispersion body, or outside, dissolved in the coagulation solution (coagulation T ranging between 20 and 90° C.).

In the case in which step d is conducted in an organic medium, PU is generally dissolved in a polar organic solvent, preferably selected from among dimethylacetamide (DMAC) and dimethylformamide (DMF), the latter being particularly preferred. Furthermore, when impregnation is carried out in an organic medium, the subsequent fixing step e is carried out by means of coagulation in water or in a water/solvent mixture. In particular, coagulation of the microfibrous intermediate product impregnated with PU in an organic solution generally takes place by means of immersion of the microfibrous intermediate product in a water bath, possibly in the presence of DMF, preferably with a ratio of $DMF/H_2O$ ranging from 0/100 up to 50/50 by weight. The coagulation temperature ranges between 20 and 50° C., preferably between 25 and 40° C., depending on the amount of DMF that may be present in the coagulation water bath. To improve adhesion of the microfibre to the polyurethane, it may be necessary to add wetters to the solution of polyurethane in an organic solvent or submit the intermediate product obtained with step c to treatment with wetting agents or agents for neutralizing the surface charge of the microfibre before proceeding with impregnation with the above-mentioned polyurethane in an organic solvent. In this regard, the wetting agents that can be utilized can be selected from among the soaps, the salts of alkali metals or of alkaline earth metals or the compounds commonly used in the art for this purpose, and known to persons skilled in the field.

Following impregnation step d, the microfibrous intermediate product is submitted to step e for fixing the PU. In the case in which the preceding step d has taken place in an aqueous medium, the fixing process can take place by means of: hot air coagulation, hot water coagulation, in an aqueous solution of electrolytes, radiofrequency coagulation, microwave coagulation, steam coagulation, or even by acid coagulation. Coagulation preferably takes place by air, hot water or radiofrequency coagulation. In the case of coagulation in an aqueous solution containing dissolved electrolytes, coagulation of the polyurethane can be achieved at a low temperature (that is, at a temperature no higher than 50° C.), leading to considerable energy savings. In the case of radiofrequency or hot air coagulation, however, it is possible to achieve the fixing of the PU thermally without necessarily reaching complete drying of the impregnated intermediate product, leading to considerable savings as regards energy and initial investment costs, if the treatment is combined with types of polyurethane dispersed in water that are capable of thermal coagulation.

In the case of hot air coagulation, the material obtained after step d is set in contact with the air at a temperature ranging between 50° C. approximately and 200° C. approximately, preferably ranging between 60° C. approximately and 160° C. approximately, so as to afford better control over the migration of the polyurethane during the heating period. The duration of the heating period can vary, for example based on the type of polyurethane being utilized, in that in the case of the use of polyurethanes that are capable of thermal coagulation, it is possible to limit the heating period for the impregnated intermediate product, thereby avoiding complete drying and thus economizing on the amount of energy required for evaporation of the water that is present. Preferably, the PU is coagulated on the microfibrous intermediate product in an oven, preferably a pin oven, at increasing temperatures ranging between 60 and 160° C. Said temperature gradient prevents the water from evaporating so rapidly that even the solid part of the dispersion is transported towards the surface, before it receives sufficient heat to break down the surfactants that keep the PU suspended. The hot air coagulation as described herein advantageously makes it possible to obtain a finished product that offers optimal resistance and durability. Moreover, with hot air coagulation, the PU tends to become transparent, thus making any specking phenomena less evident. "Specking" is intended as a visual effect in the finished product generated by a strong colour contrast between the dyed microfibre and the polyurethane matrix, which is undyed or has a colouring differing from that of the microfibre.

In the case of hot water coagulation, however, the impregnated material obtained after step d is set in contact, preferably by immersion, with water at a temperature ranging between 20° C. approximately and 100° C., preferably ranging between 40° C. approximately and 90° C. The water generally consists of deionized or softened water and it can also contain a certain amount of an agent for destabilizing the dispersion of PU and that makes it possible to lower the temperature at which the PU begins to coagulate (also defined by the term "cloud point").

One example of a destabilizing agent consists of calcium halides, preferably $CaCl_2$. The selected agent can be utilized in amounts ranging between 0.01% and 5% by weight, more preferably ranging between 0.1% and 1%. Hot water coagulation is particularly convenient when improved softness of the final product is desired.

Moreover, in a preferred embodiment of the invention, to minimize polyurethane migration during the coagulation process and/or to minimize the loss of polyurethane in the coagulation tank, a thickening agent capable of increasing the viscosity of the preparation containing the PU is also added to the same preparation. The thickener is preferably of an associative type, that is, a thickener capable of associating with the PU present in an aqueous dispersion already in the form of micelles and thus producing more complex dispersed structures in which the micelles aggregate with each other. The functioning of these associative systems is well known to persons skilled in this field.

In the case of radiofrequency coagulation, the impregnated material obtained in step d of the present process is submitted to treatment by radiofrequency irradiation, for example by means of the use of a radiofrequency oven with a parallel, oblique or vertical field and to which a voltage ranging between 0.1 kV and 10 kV is applied between the electrodes, preferably an oven with an oblique or parallel field with a voltage between the electrodes ranging between 0.1 and 6 kV, even more preferably an oven with a parallel field with a voltage between the electrodes ranging between 0.3 and 5 kV. Advantageously, radiofrequency coagulation makes it possible to achieve the fixing of the PU in very short periods of time (even on the order of s few minutes), without the need to bring the material to a completely dry state and thereby limiting phenomena involving migration of the polyurethane towards the surface of the material during the drying of the intermediate product until coagulation has taken place. In fact, even if the material exhibits residual moisture upon exiting the radiofrequency oven, complete coagulation of the PU has taken place, thereby leading to considerable advantages in terms of saving both energy and time, in addition to a qualitatively better appearance of the final product.

If in step b PVA has been used as the binding agent, after the PU has been fixed, the intermediate product is washed with hot water for removal of the binder.

After step e, the semi-finished product is dried, thus obtaining a semi-finished product IE.

The semi-finished product IE is then cut lengthwise at the centre into two microfibrous layers, preferably of identical thickness (step 2).

At least one microfibrous layer obtained by cutting is buffed on one side (defined as side N) so as to extract the microfibres and form the nap, thereby obtaining at least one microfibrous semi-finished raw product (step 3). The microfibrous semi-finished raw product is preferably of a thickness in the range of 0.5 to 1 mm, preferably 0.6 to 0.9 mm.

The microfibrous semi-finished raw product is again cut longitudinally in a direction parallel to the surfaces, producing an non-woven intermediate product (containing side N of the raw product) and a waste layer (containing the side of the raw product that has not been buffed—side S) (step 4).

The non-woven intermediate product is coupled (on the side opposite side N) to a fabric made of polyethylene terephtalate fibres by means of the application of a thermoplastic polyurethane adhesive that can be cross-linked between the non-woven intermediate product and the fabric (step 5).

The cross-linkable thermoplastic polyurethane adhesive is an adhesive that cross-links at a temperature higher than room temperature.

After heating, the coupled material is left to rest for period of time ranging from 30 to 80 hours so as to enable completion of the cross-linking reaction.

This coupling technique is called the "hot-melt" technique.

The layer of fabric used for coupling is preferably a fabric made of polyethylene terephthalate fibres. The fabric is preferably a knit fabric, preferably a circular knit fabric.

In another embodiment, the fabric is a ladder-proof fabric. The weight of the fabric is preferably comprised between 50 and 150 g/m$^2$, preferably between 60 and 120 g/m$^2$. The fabric preferably has an elongation at 50 N (UNI-EN ISO 13934/1) lengthwise comprised between 25% and 95% and crosswise comprised between 30% and 150%. The fabric has a breaking load (UNI-EN ISO 13934/1), lengthwise comprised between 300 N and 1200 N and crosswise comprised between 400 N and no breakage.

The fabric has a tear strength (EN ISO 13937-1) lengthwise comprised between 8 N and 50 N and crosswise comprised between 9 N and 40 N.

The coupled material is submitted to a dyeing process with dispersed dyes in "Jet machines" in a buffered aqueous bath with a pH between 4 and 5 at a temperature in the range of 110 to 140° C., thus obtaining a composite material characterized by a very similar colour of the two external surfaces (step 6).

The dyeing step is preferably followed by a reduction cleaning step, performed with sodium hydrosulphite, for the purpose of removing any excess dye present on the material.

In a preferred embodiment, after the dye has dried, the coupled material can undergo a further thermo-fixing step at a temperature in the range of 80 to 130° C. (step 7).

The multilayer composite material has a unit weight (UNI EN 29073-1) comprised between 200 and 300 g/m$^2$, preferably between 210 and 280 g/m$^2$. The multilayer composite material is of a thickness (EN ISO 5084) comprised between 0.6 and 1.0 mm.

The multilayer composite material is characterized by an elongation at break (UNI-EN ISO 13934/1) lengthwise comprised between 35% and 90% and crosswise comprised between 50% and 170%.

The multilayer composite material is characterized by a load at break (EN ISO 13934-1) lengthwise comprised between 300 and 800 N/5 cm, preferably between 100 and 600 N/5 cm.

The multilayer composite material is characterized by a tear strength (EN ISO 13937-2) lengthwise comprised between 30 and 90 N and crosswise comprised between 20 and 80 N.

Owing to its excellent elongation properties, the multilayer composite material can be used for particular applications including for example for covering the internal side of roofs (headliners) of vehicles (e.g. the headliners of automobiles) and for covering other components in the interior decoration sector and the automotive sector, which require extraordinary breaking strength, elongation and a certain degree of deformability of the covering.

For applications relating to covering automotive components, for example headliners of vehicles, the multilayer composite material is coupled to a polymer foam (preferably a polyurethane foam or a polyester-based polyurethane foam). This foam preferably has a thickness equal to 2-8 mm and a density comprised between 25 and 75 Kg/m$^3$.

The coupling of the multilayer composite material and the polymer foam is carried out by means of a heat lamination (or flame lamination) process. The polymer foam is partially melted as it passes over a source of heat (e.g. a flame) and subsequently calendered with the multilayer composite material. The polymer foam partially softened by the heat represents the glue.

As an alternative to the flame process, an adhesive can be interposed between the polymer foam and the multilayer composite material.

The multilayer composite material coupled to the polymer foam has a thickness (SAE J882) comprised between 2 and 8 mm.

The unit weight (SAE J860) is comprised between 300 and 400 g/m$^2$.

The multilayer composite material coupled to the polymer foam has a breaking load (ASTM D5034) lengthwise comprised between 300 and 850 N and crosswise comprised between 100 and 700 N.

The multilayer composite material coupled to the polymer foam has an elongation at break (EN ISO 13934-1) lengthwise comprised between 35 and 90% and crosswise comprised between 50 and 150%.

The multilayer composite material coupled to the polymer foam has a tear strength of trouser-shaped test specimens (EN ISO 13937-2) lengthwise comprised between 30 and 90 N and crosswise comprised between 20 and 80 N.

The multilayer composite material coupled to the polymer foam can thus be applied to the object to be covered (for example the underside of the roof of an automobile) by means of a thermally activated thermoplastic adhesive and then trimmed around the perimeter of the object by means of a stapling machine.

In its application to the object to be covered, the multilayer composite material has demonstrated good resistance properties to elongation and to the conditions of perimeter trimming without breakage or tearing. Moreover, it has been possible to cover objects with very pronounced recesses and protrusions with the multilayer composite material of the invention without breakage or tearing occurring at the hollows and curves.

Figure 1:
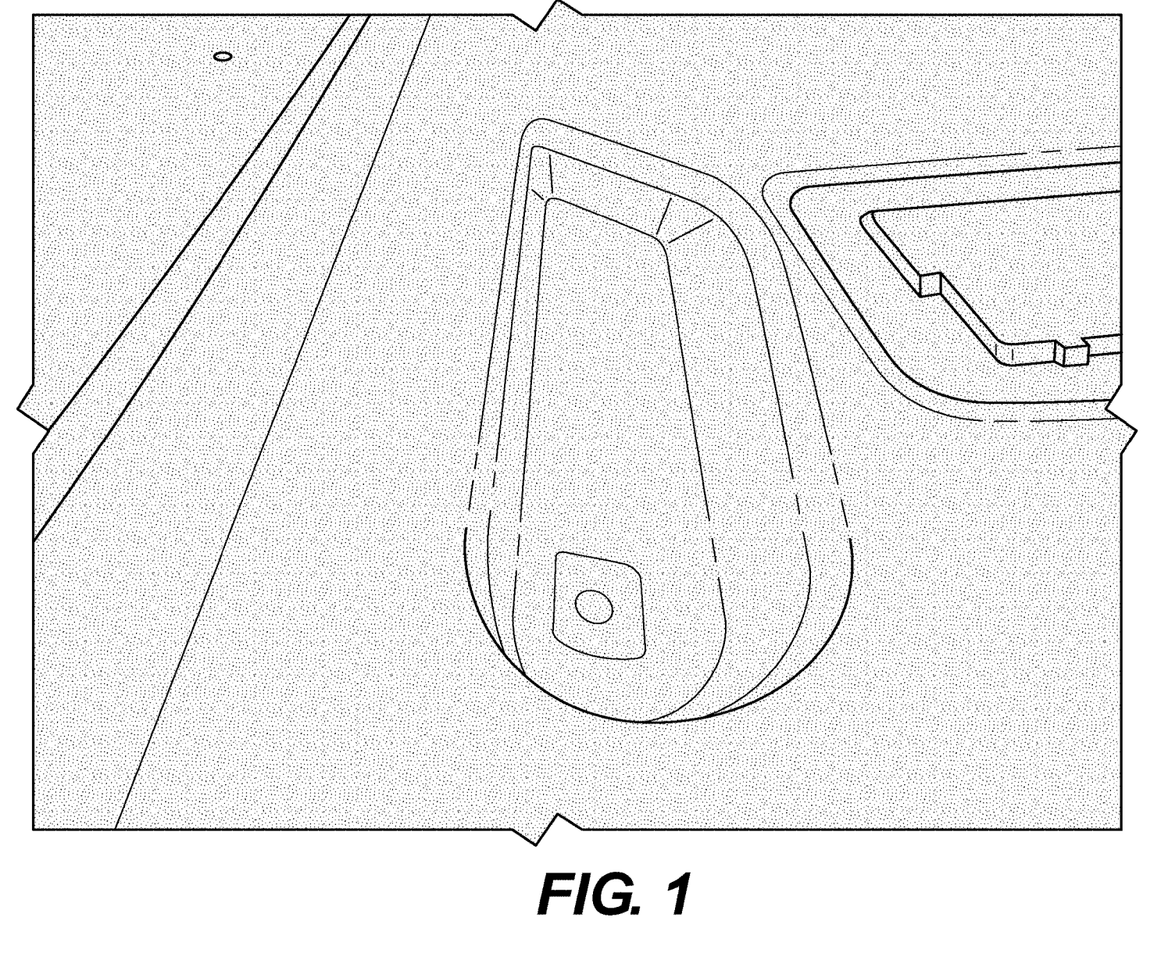
Figure 2:
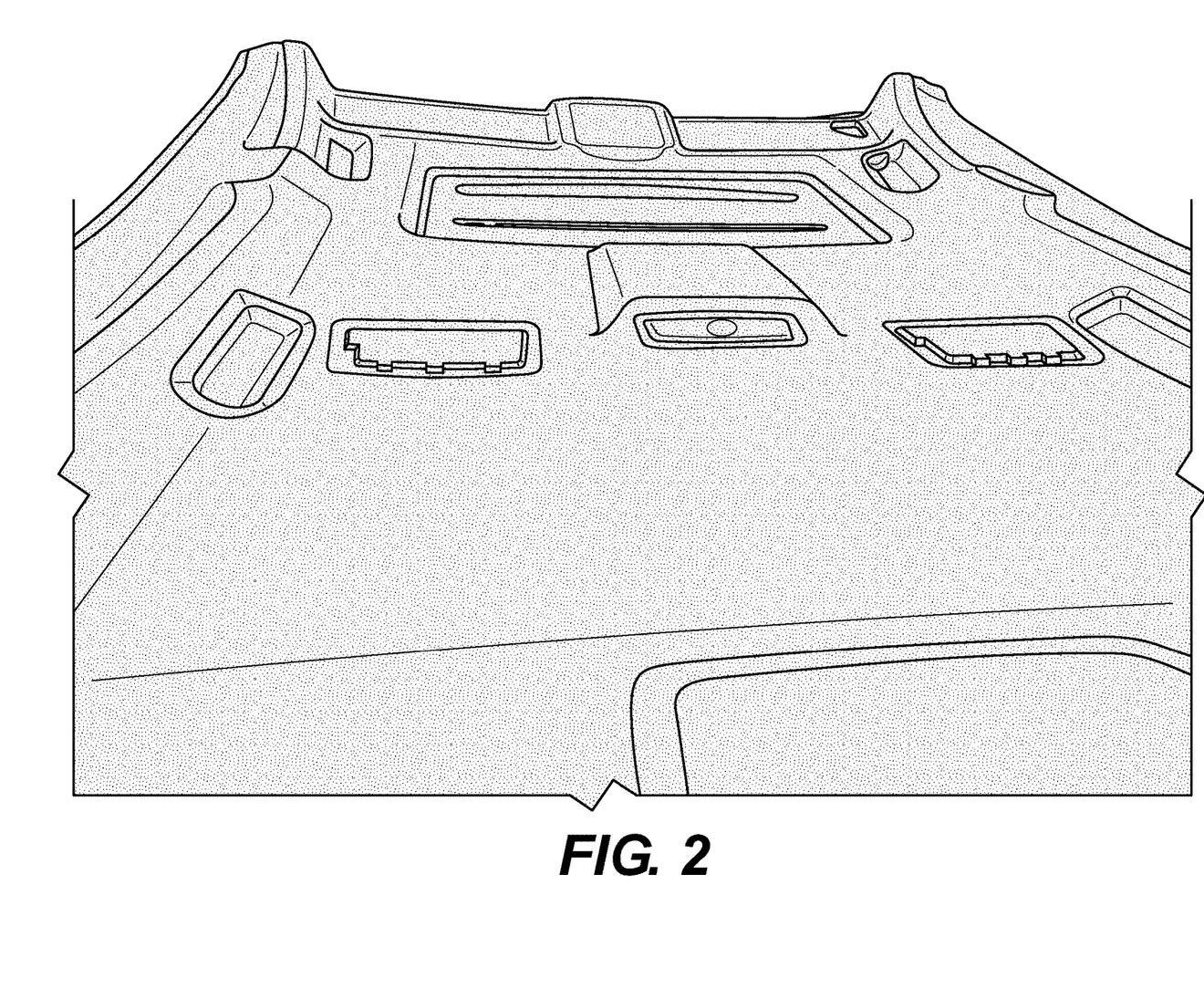
Figure 3:
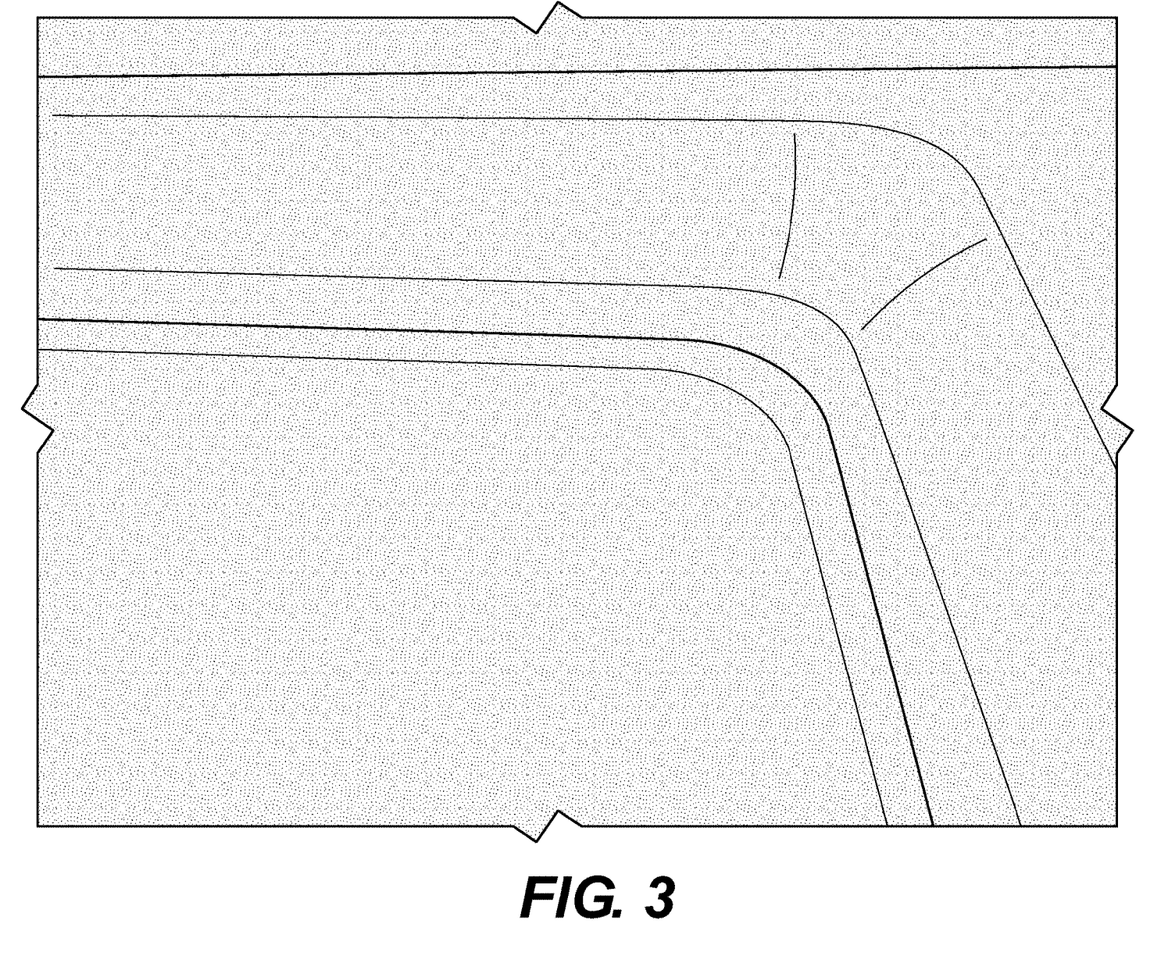
Figure 4:
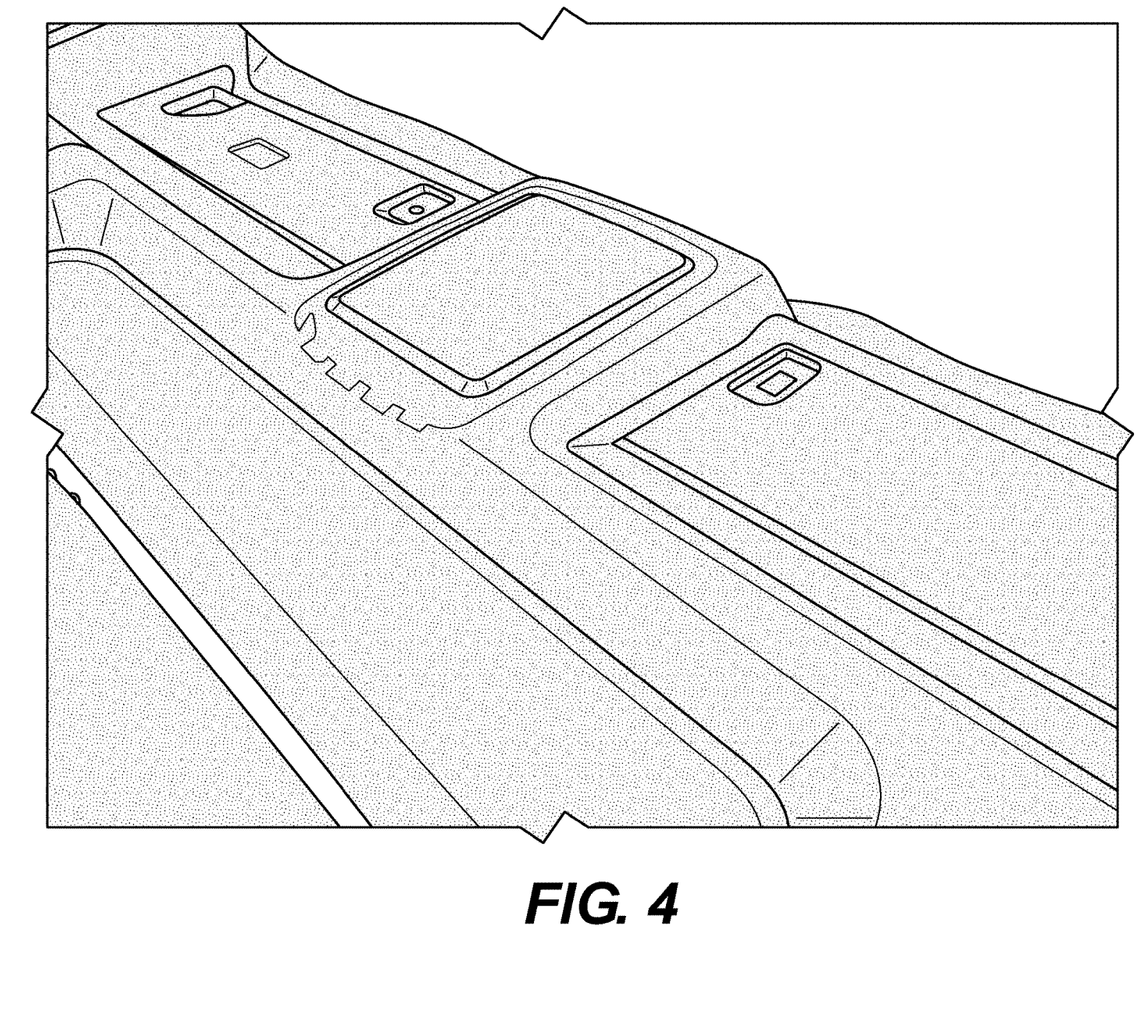
Figure 5:
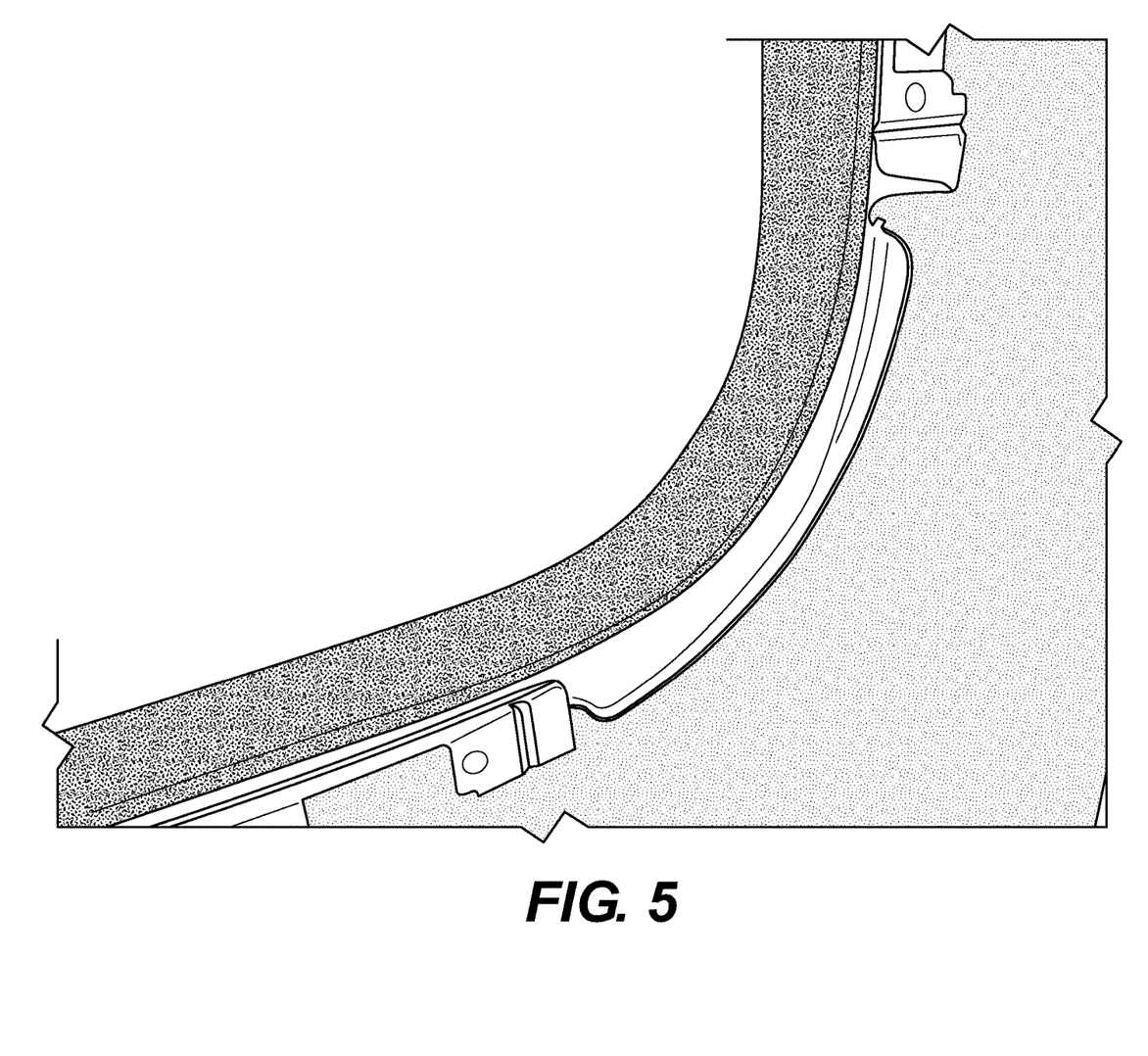
FIGS. 5 and 6 show a detail of the object appearing in FIGS. 1-4 relating to the trim points of the headliner.
Figure 6:
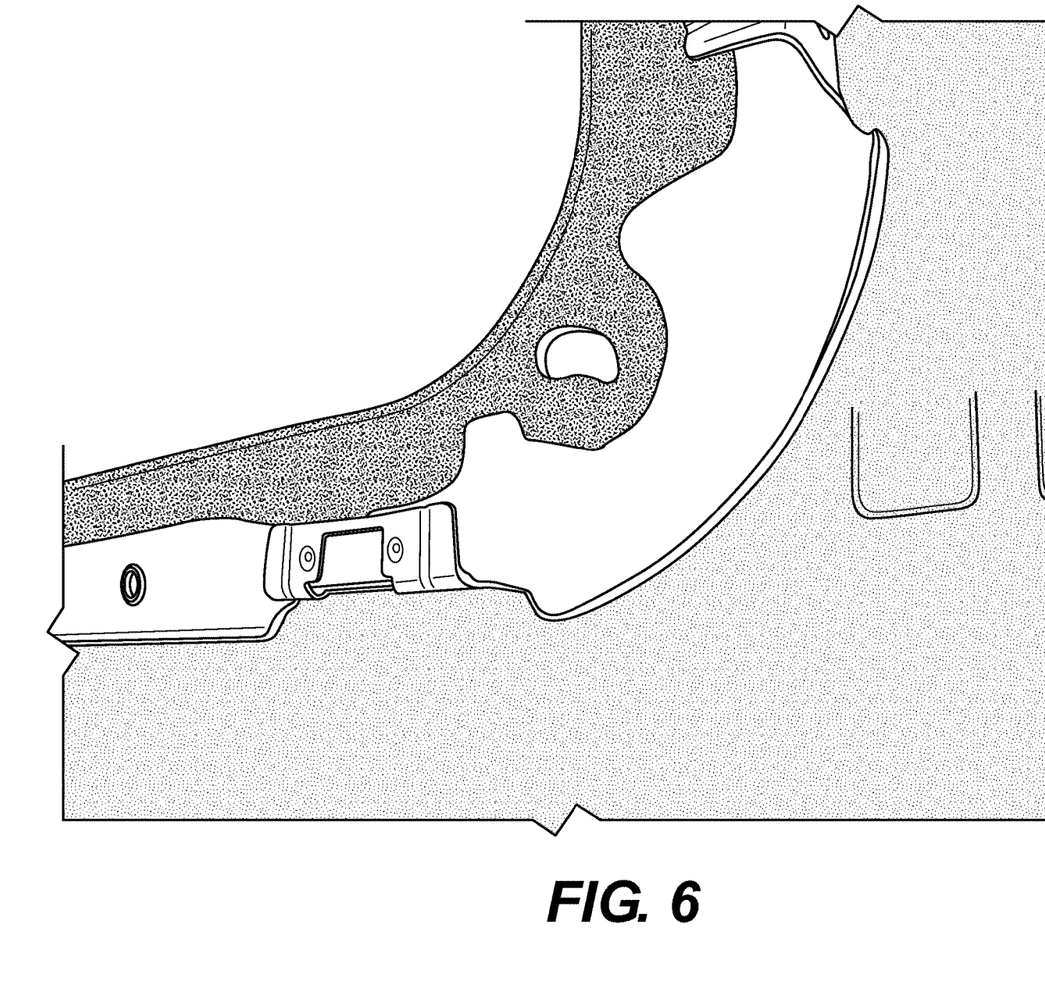

For example, FIGS. 1-6 show the underside of an automobile roof covered with the multilayer composite material of the present invention. As can be noted from the figures, the multilayer composite material makes it possible to achieve perfect adherence to the shape of the rigid underside, along the hollows, the corners and the curves of the object without creases or breakage. Moreover, it can be seen from FIGS. 5 and 6 that the trimming of the multilayer composite material is performed optimally without any occurrence of breakage or tearing.

EXAMPLES

The table contains the legend for the abbreviations used in the examples to identify the raw materials.

| ABBREVIATION | RAW MATERIAL |
| --- | --- |
| PET | Polyethylene terephthalate |
| PS | Polystyrene |
| Co-PES | copolyester containing 5-sulphoisophthalic acid |
| PVA | Polyvinyl alcohol |
| PHC | Poly(hexamethylene carbonate) glycol |
| PNA | Poly(neopentyl glycol adipate) |
| MDI | 4-4' Methylene diphenyl diisocyanate |
| DBA | Dibutylamine |
| PUR | Reactive thermoplastic polyurethane |
| PUD | Aqueous polyurethane dispersion |

Example 1

A staple bicomponent fibre is prepared, said staple bicomponent fibre consisting of PET microfibres (0.14÷0.17 dtex) in a PS matrix and having the following characteristics:
1 Denier Count: 4.2 dtex
2 Length: 51 mm
3 Curls: about 4-5/cm In particular, the fibre consists of 57 parts by weight of PET and 43 parts by weight of PS. When observed in section, the fibre reveals the presence of 16 PET microfibres englobed in the PS matrix.

A felt is prepared with the bicomponent fibre by mechanical needle-punching, said felt having densities within the range of 0.150÷0.200 g/cm$^3$ and unit weights in the range of 580÷630 g/m$^2$.

The needle-punched felt is immersed in a 12% by weight aqueous solution of polyvinyl alcohol and then dried. The needle-punched felt thus treated is subsequently immersed in trichloroethylene until the polystyrene matrix of the fibres has completely dissolved. One then proceeds with drying the non-woven fabric thus formed, obtaining an intermediate product called "semi-finished product D".

A polyurethane elastomer in the form of a solution in DMF is prepared separately. In a first stage (pre-polymerization), PHC and PNA, both of a molecular weight of 2,000, are reacted at a temperature of 65° C. and under agitation, with MDI in an isocyanate/diols molar ratio of 2.9/1. Three hours after the beginning of the reaction, the pre-polymer thus obtained is cooled to a temperature of 45° C. and diluted with DMF, having a water content of 0.03%, until a 25% solution of pre-polymer having a 1.46% content of free NCO groups is obtained.

DBA and water dissolved in DMF are then slowly added over a period of 5 minutes, maintaining the temperature at 45° C., so as to obtain a polyurethane-polyurea solution with a calculated molecular weight equal to 43,000. After raising the temperature to 65° C., the reactor is kept under agitation for 8 more hours, obtaining, at the end, a polyurethane-polyurea solution that is stable over time and that has a viscosity of 24,000 mPa*sec at 20° C. The elastomer solution thus prepared is then diluted with DMF containing Tinuvin® 622 and Tinuvin® 326 to form a 14% by weight solution. When coagulated in water, the polymer obtained in solution is capable of generating high porosity structures.

The "semi-finished product D" prepared as described above, is immersed in the polyurethane elastomer solution, squeezed by passing it between a pair of rollers and subsequently immersed for 1 hour in a water bath kept at 40° C. A coagulated intermediate product is thus obtained and it is passed into a water bath heated to 80° C. to extract the residual solvent and polyvinyl alcohol. After drying, a composite product ("semi-finished product IE") is obtained and it is then cut lengthwise at the centre into 2 microfibrous layers of identical thickness. The semi-finished products thus obtained are buffed, principally on the external surface (side N), to extract the microfibres therefrom and form the flock. The result is a synthetic microfibrous non-woven fabric called the "raw product" and that has a mean thickness of 0.74 mm.

The "raw product" is again cut longitudinally in a direction parallel to the surfaces, producing an non-woven intermediate product (containing side N of the "raw product") of a mean thickness of 0.38 mm, and a waste layer (containing side S of the inspected raw product). The non-woven intermediate product is then coupled on the side opposite side N of the "raw product" by means of a hot-melt process (using a reactive thermoplastic polyurethane adhesive at a temperature of 140° C.) with a circular knit fabric realized with PET yarns, so as to constitute a double-layered structure. The fabric used as reinforcement ("Mizar") has a unit weight of 60 g/m$^2$ and elongations at 50 N lengthwise/crosswise (UNI-EN ISO 13934/1) of 94% and 48%, respectively. A "Perform Mizar semi-finished product" is thus obtained and it is then jet-dyed according to the traditional technology used for suede-like leathers of the prior art.

By virtue of the total absence of fibres belonging to the reinforcing fabric in the microfibrous layer, the appearance of the artificial leather thus obtained is totally similar to that of prior-art artificial leather of high quality. However, this artificial leather is distinguished by elevated physico-mechanical properties (given to the composite product by the fabric used as reinforcement), which enable thermoformed products of the automobile and furnishings sectors to be covered with low or even no pre-heating. This particular feature also makes it possible to obtain a composite material that has two external surfaces characterized by a very similar colour. The final composite material has a unit weight of 210 g/m$^2$ and elongations at break lengthwise/crosswise (UNI-EN ISO 13934/1) of 65% and 125%, respectively.

Based on the percentage of shrinkage in the dyeing process and the final application, the dyed product can undergo an optional thermo-fixing treatment in a stenter at 10 m/min and a temperature of 110° C.

Example 2

A staple bicomponent fibre is prepared, said staple bicomponent fibre consisting of PET microfibres (0.14÷0.17 dtex) in a PS matrix and having the following characteristics:
1 Denier Count: 4.2 dtex
2 Length: 51 mm
3 Curls: about 4-5/cm In particular, the fibre consists of 57 parts by weight of PET and 43 parts by weight of PS. When observed in section, the fibre reveals the presence of 16 PET microfibres englobed in the PS matrix.

A felt is prepared with the bicomponent fibre by mechanical needle-punching, said felt having densities within the range of 0.150÷0.200 g/cm3 and unit weights in the range of 580÷630 g/m$^2$.

The needle-punched felt is immersed in a 12% by weight aqueous solution of polyvinyl alcohol and then dried. The needle-punched felt thus treated is subsequently immersed in trichloroethylene until the polystyrene matrix of the fibres has completely dissolved. One then proceeds with drying the non-woven fabric thus formed, obtaining an intermediate product called "semi-finished product D".

A polyurethane elastomer in the form of a solution in DMF is prepared separately. In a first stage (pre-polymerization), PHC and PNA, both of a molecular weight of 2,000, are reacted at a temperature of 65° C. and under agitation, with MDI in an isocyanate/diols molar ratio of 2.9/1. Three hours after the beginning of the reaction, the pre-polymer thus obtained is cooled to a temperature of 45° C. and diluted with DMF, having a water content of 0.03%, until a 25% solution of pre-polymer having a 1.46% content of free NCO groups is obtained.

DBA and water dissolved in DMF are then slowly added over a period of 5 minutes, maintaining the temperature at 45° C., so as to obtain a polyurethane-polyurea solution with a calculated molecular weight equal to 43,000. After raising the temperature to 65° C., the reactor is kept under agitation for 8 more hours, obtaining, at the end, a polyurethane-polyurea solution that is stable over time and that has a viscosity of 24,000 mPa*sec at 20° C. The elastomer solution thus prepared is then diluted with DMF containing Tinuvin® 622 and Tinuvin® 326 to form a 14% by weight solution. When coagulated in water, the polymer obtained in solution is capable of generating high porosity structures.

The "semi-finished product D" prepared as described above, is immersed in the polyurethane elastomer solution, squeezed by passing it between a pair of rollers and subsequently immersed for 1 hour in a water bath kept at 40° C. A coagulated intermediate product is thus obtained and it is passed into a water bath heated to 90° C. to extract the residual solvent and polyvinyl alcohol. After drying, a composite product ("semi-finished product IE") is obtained and it is then cut lengthwise at the centre into 2 microfibrous layers of identical thickness. The semi-finished products thus obtained are buffed, principally on the external surface (side N), to extract the microfibres therefrom and form the flock. The result is a synthetic microfibrous non-woven fabric called the "raw product" and that has a mean thickness of 0.74 mm.

The "raw product" is again cut longitudinally in a direction parallel to the surfaces, producing an non-woven intermediate product (containing side N of the "raw product") of a mean thickness of 0.38 mm, and a waste layer (containing side S of the inspected raw product). The non-woven intermediate product is then coupled on the side opposite side "N" of the "raw product" by means of a hot-melt process (using a reactive thermoplastic polyurethane adhesive at a temperature of 140° C.) with a circular knit fabric realized with PET yarns, so as to constitute a double-layered structure. The fabric used as reinforcement ("Interlock") has a unit weight of 105 g/m$^2$ and elongations at 50 N lengthwise/crosswise (UNI-EN ISO 13934/1) of 25% and 140%, respectively. A "Perform Interlock semi-finished product" is thus obtained and it is then jet-dyed according to the traditional technology used for suede-like leathers of the prior art.

By virtue of the total absence of fibres belonging to the reinforcing fabric in the microfibrous layer, the appearance of the artificial leather thus obtained is totally similar to that of prior-art artificial leather of high quality. However, this artificial leather is distinguished by elevated physico-mechanical properties (given to the composite product by the fabric used as reinforcement), which enable thermoformed products of the automobile and furnishings sectors to be covered with low or even no pre-heating. This particular feature also makes it possible to obtain a composite material that has two external surfaces characterized by a very similar colour. The final composite material has a unit weight of 275 g/m$^2$ and elongations at break lengthwise/crosswise (UNI-EN ISO 13934/1) of 78% and 87%, respectively.

Based on the percentage of shrinkage in the dyeing process and the final application, the dyed product can undergo an optional thermo-fixing treatment in a stenter at 10 m/min and a temperature of 110° C.

Example 3

A staple bicomponent fibre is prepared, said staple bicomponent fibre consisting of PET microfibres (0.14÷0.17 dtex) in a PS matrix and having the following characteristics:
1 Denier Count: 4.2 dtex
2 Length: 51 mm
3 Curls: about 4-5/cm In particular, the fibre consists of 57 parts by weight of PET and 43 parts by weight of PS. When observed in section, the fibre reveals the presence of 16 PET microfibres englobed in the PS matrix.

A felt is prepared with the bicomponent fibre by mechanical needle-punching, said felt having densities within the range of 0.150÷0.200 g/cm$^3$ and unit weights in the range of 580÷630 g/m$^2$.

The needle-punched felt is immersed in a 12% by weight aqueous solution of polyvinyl alcohol and then dried. The needle-punched felt thus treated is subsequently immersed in trichloroethylene until the polystyrene matrix of the fibres has completely dissolved. One then proceeds with drying the non-woven fabric thus formed, obtaining an intermediate product called "semi-finished product D".

A polyurethane elastomer in the form of a solution in DMF is prepared separately. In a first stage (pre-polymerization), PHC and PNA, both of a molecular weight of 2,000, are reacted at a temperature of 65° C. and under agitation, with MDI in an isocyanate/diols molar ratio of 2.9/1. Three hours after the beginning of the reaction, the pre-polymer thus obtained is cooled to a temperature of 45° C. and diluted with DMF, having a water content of 0.03%, until a 25% solution of pre-polymer having a 1.46% content of free NCO groups is obtained.

DBA and water dissolved in DMF are then slowly added over a period of 5 minutes, maintaining the temperature at 45° C., so as to obtain a polyurethane-polyurea solution with a calculated molecular weight equal to 43,000. After raising the temperature to 65° C., the reactor is kept under agitation for 8 more hours, obtaining, at the end, a polyurethane-polyurea solution that is stable over time and that has a viscosity of 24,000 mPa*sec at 20° C. The elastomer solution thus prepared is then diluted with DMF containing Tinuvin® 622 and Tinuvin® 326 to form a 14% by weight solution. When coagulated in water, the polymer obtained in solution is capable of generating high porosity structures.

The "semi-finished product D" prepared as described above, is immersed in the polyurethane elastomer solution, squeezed by passing it between a pair of rollers and subsequently immersed for 1 hour in a water bath kept at 40° C. A coagulated intermediate product is thus obtained and it is passed into a water bath heated to 80° C. to extract the residual solvent and polyvinyl alcohol. After drying, a composite product ("semi-finished product IE") is obtained and it is then cut lengthwise at the centre into 2 microfibrous layers of identical thickness. The semi-finished products thus obtained are buffed, principally on the external surface (side N), to extract the microfibres therefrom and form the flock. The result is a synthetic microfibrous non-woven fabric called the "raw product" and that has a mean thickness of 0.74 mm.

The "raw product" is again cut longitudinally in a direction parallel to the surfaces, producing an non-woven intermediate product (containing side N of the "raw product") of a mean thickness of 0.38 mm, and a waste layer (containing side S of the inspected raw product). The non-woven intermediate product is then coupled on the side opposite side "N" of the "raw product" by means of a hot-melt process (using a reactive thermoplastic polyurethane adhesive at a temperature of 140° C.) with a ladder-proof fabric realized with PET yarns, so as to constitute a double-layered structure. The fabric used as reinforcement ("Eiffel") has a unit weight of 85 g/m$^2$ and elongations at 50 N lengthwise/crosswise (UNI-EN ISO 13934/1) of 38% and 32%, respectively. A "Perform Eiffel semi-finished product" is thus obtained and it is then jet-dyed according to the traditional technology used for suede-like leathers of the prior art.

By virtue of the total absence of fibres belonging to the reinforcing fabric in the microfibrous layer, the appearance of the artificial leather thus obtained is totally similar to that of prior-art artificial leather of high quality. However, this artificial leather is distinguished by elevated physico-mechanical properties (given to the composite product by the fabric used as reinforcement), which enable thermoformed products of the automobile and furnishings sectors to be covered with low or even no pre-heating. This particular feature also makes it possible to obtain a composite material that has two external surfaces characterized by a very similar colour. The final composite material has a unit weight of 250 g/m$^2$ and elongations at break lengthwise/crosswise (UNI-EN ISO 13934/1) of 65% and 75%, respectively.

Based on the percentage of shrinkage in the dyeing process and the final application, the dyed product can undergo an optional thermo-fixing treatment in a stenter at 10 m/min and a temperature of 110° C.

Example 4

A staple bicomponent fibre is prepared, said staple bicomponent fibre consisting of PET microfibres (0.14÷0.17 dtex) in a Co-PES matrix and having the following characteristics:
1 Denier Count: 4.2 dtex
2 Length: 51 mm
3 Curls: about 4-5/cm In particular, the fibre consists of 57 parts by weight of PET and 43 parts by weight of Co-PES. When observed in section, the fibre reveals the presence of 16 PET microfibres englobed in the Co-PES matrix.

A felt is prepared with the bicomponent fibre by mechanical needle-punching, said felt having densities within the range of 0.170÷0.230 g/cm$^3$ and unit weights in the range of 580÷640 g/m$^2$.

The needle-punched felt is immersed in a 12% by weight aqueous solution of polyvinyl alcohol with a high degree of saponification and subjected to thermal treatments aimed first at drying the semi-finished product and then at cross-linking the PVA (curing) at a high temperature (about 190° C.).

The needle-punched felt thus treated is subsequently immersed in an 8% basic solution of NaOH at a temperature of 60° C. until the sea component is completely removed, and then washed with water. The preceding curing stage has made the PVA sufficiently resistant to the alkaline hydrolysis conditions. One then proceeds with drying the non-woven fabric thus formed, obtaining an intermediate product called "semi-finished product CD".

An aqueous dispersion containing WITCOBOND 279-34 polyurethane emulsions, a thickener and a cross-linking agent is prepared separately. Specifically, the WITCOBOND 279-34 polyurethane (an aliphatic, polyether-based PUD with anionic character, produced by Chemtura) constitutes 18% of the dispersion by weight, the TAFIGEL PUR 44 thickener constitutes 1.1% and the carbodiimide crosslinker Carbodilite SV-02 produced by Nisshinbo Inc. constitutes 1.0%. The formulation thus obtained has a viscosity of 586 cP and a cloud point of 92° C. The "semi-finished product CD" prepared as described hereinabove is immersed in the polyurethane elastomer dispersion, squeezed by passing it between a pair of rollers and immediately passed into a pin oven at a temperature of 150° C. for a period of time sufficient to ensure drying and activation of the cross-linking agent. The barrier effect of the PVA present on the edges acts in such a manner that most of the PUD proves to be distributed in the centre of the composite material.

Once the polyurethane matrix has been cross-linked, the PVA is removed at 95° C. in a vibro washer with hot water at 95° C.

After drying, a composite product ("semi-finished product IE") is obtained and it is then cut lengthwise at the centre into 2 microfibrous layers of identical thickness. The semi-finished products thus obtained are buffed, principally on the external surface (side N), to extract the microfibres therefrom and form the flock. The result is a synthetic microfibrous non-woven fabric called the "raw product" and that has a mean thickness of 0.74 mm.

The "raw product" is again cut longitudinally in a direction parallel to the surfaces, producing an non-woven intermediate product (containing side N of the "raw product") of a mean thickness of 0.38 mm, and a waste layer (containing side S of the inspected raw product). The non-woven intermediate product is then coupled on the side opposite side "N" of the "raw product" by means of a hot-melt process (using a reactive thermoplastic polyurethane adhesive at a temperature of 140° C.) with a circular knit fabric realized with PET yarns, so as to constitute a double-layered structure. The fabric used as reinforcement ("Interlock") has a unit weight of 105 g/m$^2$ and elongations at 50 N lengthwise/crosswise (UNI-EN ISO 13934/1) of 25% and 140%, respectively. A "Perform Interlock semi-finished product" is thus obtained and it is then jet-dyed according to the traditional technology used for suede-like leathers of the prior art.

By virtue of the total absence of fibres belonging to the reinforcing fabric in the microfibrous layer, the appearance of the artificial leather thus obtained is totally similar to that of prior-art artificial leather of high quality. However, this artificial leather is distinguished by elevated physico-mechanical properties (given to the composite product by the fabric used as reinforcement), which enable thermoformed products of the automobile and furnishings sectors to be covered with low or even no pre-heating. This particular feature also makes it possible to obtain a composite material that has two external surfaces characterized by a very similar colour. The final composite material has a unit weight of 267 g/m$^2$ and elongations at break lengthwise/crosswise (UNI-EN ISO 13934/1) of 64% and 97%, respectively.

Based on the percentage of shrinkage in the dyeing process and the final application, the dyed product can undergo an optional thermo-fixing treatment in a stenter at 10 m/min and a temperature of 110° C.

Example 5

A staple bicomponent fibre is prepared, said staple bicomponent fibre consisting of PET microfibres (0.14÷0.17 dtex) in a Co-PES matrix and having the following characteristics:
1 Denier Count: 4.2 dtex
2 Length: 51 mm
3 Curls: about 4/cm In particular, the fibre consists of 57 parts by weight of PET and 43 parts by weight of Co-PES.

The PET microfibres are mixed, in the extrusion stage, with Carbon Black in a proportion of 1% by weight.

When observed in section, the fibre reveals the presence of 16 PET microfibres englobed in the Co-PES matrix.

A felt is prepared with the bicomponent fibre by mechanical needle-punching, said felt having densities within the range of 0.170÷0.230 g/cm$^3$ and unit weights in the range of 520÷640 g/m$^2$.

The needle-punched felt is immersed in a 12% by weight aqueous solution of polyvinyl alcohol with a high degree of saponification and subjected to thermal treatments aimed first at drying the semi-finished product and then at cross-linking the PVA (curing) at a high temperature (about 190° C.).

The needle-punched felt thus treated is subsequently immersed in an 8% basic solution of NaOH at a temperature of 60° C. until the sea component is completely removed, and then washed with water. The preceding curing stage has made the PVA sufficiently resistant to the alkaline hydrolysis conditions. One then proceeds with drying the non-woven fabric thus formed, obtaining an intermediate product called "semi-finished product CD".

An aqueous dispersion containing WITCOBOND 279-34 polyurethane emulsions, a thickener and a cross-linking agent is prepared separately. Specifically, the WITCOBOND 279-34 polyurethane (an aliphatic, polyether-based PUD with anionic character, produced by Chemtura) constitutes 18% of the dispersion by weight, the TAFIGEL PUR 44 thickener constitutes 1.1% and the carbodiimide crosslinker Carbodilite SV-02 produced by Nisshinbo Inc. constitutes 1.0%. The formulation thus obtained has a viscosity of 586 cP and a cloud point of 92° C.

The "semi-finished product CD" prepared as described hereinabove is immersed in the polyurethane elastomer dispersion, squeezed by passing it between a pair of rollers and immediately passed into a pin oven at a temperature of 150° C. for a period of time sufficient to ensure drying and activation of the cross-linking agent. The barrier effect of the PVA present on the edges acts in such a manner that most of the PUD proves to be distributed in the centre of the composite material.

Once the polyurethane matrix has been cross-linked, the PVA is removed at 95° C. in a vibro washer with hot water at 95° C.

After drying, a composite product ("semi-finished product IE") is obtained and it is then cut lengthwise at the centre into 2 microfibrous layers of identical thickness. The semi-finished products thus obtained are buffed, principally on the external surface (side N), to extract the microfibres therefrom and form the flock. The result is a synthetic microfibrous non-woven fabric called the "raw product" and that has a mean thickness of 0.74 mm.

The "raw product" is again cut longitudinally in a direction parallel to the surfaces, producing an non-woven intermediate product (containing side N of the "raw product") of a mean thickness of 0.38 mm, and a waste layer (containing side S of the inspected raw product). The non-woven intermediate product is then coupled on the side opposite side "N" of the "raw product" by means of a hot-melt process (using a reactive thermoplastic polyurethane adhesive at a temperature of 140° C.) with a circular knit fabric realized with PET yarns, so as to constitute a double-layered structure. The fabric used as reinforcement ("Interlock") has a unit weight of 105 g/m$^2$ and elongations at 50 N lengthwise/crosswise (UNI-EN ISO 13934/1) of 25% and 140%, respectively. A "Perform Interlock semi-finished product" is thus obtained and it is then jet-dyed according to the traditional technology used for suede-like leathers of the prior art.

By virtue of the total absence of fibres belonging to the reinforcing fabric in the microfibrous layer, the appearance of the artificial leather thus obtained is totally similar to that of prior-art artificial leather of high quality. However, this artificial leather is distinguished by elevated physico-mechanical properties (given to the composite product by the fabric used as reinforcement), which enable thermoformed products of the automobile and furnishings sectors to be covered with low or even no pre-heating. This particular feature also makes it possible to obtain a composite material that has two external surfaces characterized by a very similar colour. The final composite material has a unit weight of 226 g/m² and elongations at break lengthwise/crosswise (UNI-EN ISO 13934/1) of 56% and 89%, respectively.

Based on the percentage of shrinkage in the dyeing process and the final application, the dyed product can undergo an optional thermo-fixing treatment in a stenter at 10 m/min and a temperature of 110° C.

Example 6—Applicative Tests Conducted and Results

Prior to flame coupling with a polyester-based polyurethane foam (thickness: 3.7 mm; density: 35 kg/m³), the multilayer products obtained as per Examples 1-5 were subjected to an applicative test for thermoforming an automobile headliner with a central opening for the sunroof. The industrial process comprised a dual processing stage with pre-forming of the rigid backing of the headliner and subsequent application of the foamed multilayer composite material by gluing the multilayer material by means of a thermally activated thermoplastic adhesive film. Once the covering process was completed, the multilayer material underwent automatic trimming at room temperature along the perimeter of the headliner (as shown in FIGS. 1-6) without tearing or breakage.

The invention claimed is:

1. A process for preparing a microfibrous multilayer composite material comprising:
  1) cutting a non-woven microfibrous semi-finished product made up of microfibres of one or more polymers dispersed in a polyurethane matrix lengthwise into two layers;
  2) buffing at least one layer on one side (side N) so as to extract the microfibres and form a nap, thereby obtaining a semi-finished raw product;
  3) cutting the semi-finished raw product lengthwise parallel to the surfaces, producing an non-woven intermediate product, containing the buffed side (side N) and a waste layer containing the side that has not been buffed (side S);
  4) coupling the non-woven intermediate product on the side opposite side N to a fabric made of polyethylene terephthalate fibres by applying a cross-linkable thermoplastic polyurethane adhesive between the non-woven intermediate product and the fabric to form a microfibrous multilayer composite material; and
  5) submitting the multilayer composite material to a jet dyeing process.

2. The process according to claim 1, wherein said non-woven intermediate product obtained in step 3) has a thickness ranging from 0.25 to 0.5 mm.

3. The process according to claim 2, wherein the thickness ranges from 0.30 to 0.45 mm.

4. The process according to claim 1, wherein said cross-linkable thermoplastic polyurethane adhesive is an adhesive that cross-links at a temperature higher than room temperature.

5. The process according to claim 1, further comprising, following step 4), the step of leaving the coupled material to rest for a period of time ranging from 30 to 80 hours, so as to enable completion of the cross-linking reaction.

6. The process according to claim 1, wherein said microfibrous semi-finished product is obtained by the following steps:
  a. preparing a felt by needle-punching a bicomponent fibre of the "island-in-the-sea" type;
  b. hot impregnation of said felt with an aqueous solution of polyvinyl alcohol (PVA) having a degree of saponification of at least 88%, to produce an intermediate product;
  c. removal of the sea component from the intermediate product to produce a microfibrous intermediate product;
  d. impregnation of the microfibrous intermediate product with polyurethane (PU); and
  e. fixing the PU to the microfibrous intermediate product by coagulating and removing the PVA added in step b to produce a microfibrous semi-finished product.

7. The process according to claim 1, wherein said microfibrous semi-finished product is obtained by the following steps:
  a. preparing a felt by needle-punching a bicomponent fibre of the "island-in-the-sea" type;
  b. hot impregnation of said felt with water and then cold impregnation with polyurethane (PU) to produce an intermediate product;
  c. removal of the sea component from the intermediate product to produce a microfibrous intermediate product;
  d. impregnation of the microfibrous intermediate product with PU; and
  e. fixing the PU to the microfibrous intermediate product by coagulation to produce a microfibrous semi-finished product.

8. A microfibrous multilayer composite material obtained using the process according to claim 1.

9. The material according to claim 8, wherein said fabric is a knit fabric.

10. The material according to claim 9, wherein said knit fabric is a circular knit or ladder-proof fabric.

11. The material according to claim 8, wherein said fabric has a weight ranging from 50 to 150 g/m²; has an elongation at 50 N lengthwise ranging from 25% to 95%, crosswise ranging from 30% to 150%; a breaking load lengthwise ranging from 300 N to 1200 N, crosswise ranging from 400 N to no breakage; and a tear strength lengthwise ranging from 8 N to 50 N, crosswise ranging from 9 N to 40 N.

12. The material according to claim 11, wherein said fabric has a weight ranging from 60 to 120 g/m².

13. The material according to claim 8, wherein said microfibrous multilayer composite material has a unit weight ranging from 200 to 300 g/m², and a thickness ranging from 0.6 to 1.0 mm.

14. The material according to claim 13, wherein said microfibrous multilayer composite material has a unit weight ranging from 210 to 280 g/m².

15. The material according to claim 8, wherein said microfibrous multilayer composite material has an elongation at break lengthwise ranging from 35% to 90%, crosswise ranging from 50% to 170%; a load at break lengthwise ranging from 300 to 800 N/5 cm; and a tear strength lengthwise ranging from 30 to 90 N, crosswise ranging from 20 to 80 N.

16. The material according to claim 15, wherein said microfibrous multilayer composite material has a load at break lengthwise ranging from 500 to 750 N/5 cm.

17. The microfibrous multilayer composite material according to claim 8, coupled to a polymer foam, wherein said polymer foam has a thickness ranging from 2-8 mm and a density ranging from 25 to 75 kg/m$^3$.

18. The microfibrous multilayer composite material according to claim 17, wherein the foam is a polyurethane foam or a polyester-based polyurethane foam.

19. A method of using the material according to claim 8 for covering the internal side of a roof, as a headliner of a vehicle, or for covering a furnishing element, comprising the step of applying the material according to claim 8 for covering the internal side of a roof, as a headliner of a vehicle, or for covering a furnishing element.

\* \* \* \* \*